(12) United States Patent
Goldenberg et al.

(10) Patent No.: US 11,968,453 B2
(45) Date of Patent: Apr. 23, 2024

(54) OPTICAL IMAGE STABILIZATION IN A SCANNING FOLDED CAMERA

(71) Applicant: Corephotonics Ltd., Tel Aviv (IL)

(72) Inventors: Ephraim Goldenberg, Ashdod (IL); Noy Cohen, Tel Aviv (IL); Yiftah Kowal, Rehovot (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/614,382

(22) PCT Filed: Jul. 22, 2021

(86) PCT No.: PCT/IB2021/056617
§ 371 (c)(1),
(2) Date: Nov. 26, 2021

(87) PCT Pub. No.: WO2022/034402
PCT Pub. Date: Feb. 17, 2022

(65) Prior Publication Data
US 2023/0164437 A1    May 25, 2023

Related U.S. Application Data

(60) Provisional application No. 63/064,565, filed on Aug. 12, 2020.

(51) Int. Cl.
*H04N 13/246* (2018.01)
*G03B 17/17* (2021.01)
(Continued)

(52) U.S. Cl.
CPC ........... *H04N 23/687* (2023.01); *G03B 17/17* (2013.01); *H04N 23/45* (2023.01); *H04N 23/55* (2023.01);
(Continued)

(58) Field of Classification Search
CPC .... H04N 23/687; H04N 23/61; H04N 23/683; H04N 23/58; H04N 23/6812; H04N 23/45; H04N 23/698; H04N 23/55; G03B 17/17
See application file for complete search history.

(56) References Cited

U.S. PATENT DOCUMENTS

| | | |
|---|---|---|
| 4,199,785 A | 4/1980 | McCullough et al. |
| 5,005,083 A | 4/1991 | Grage et al. |
| (Continued) | | |

FOREIGN PATENT DOCUMENTS

| | | |
|---|---|---|
| CN | 101276415 A | 10/2008 |
| CN | 201514511 U | 6/2010 |
| (Continued) | | |

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Patrick E Demosky
(74) *Attorney, Agent, or Firm* — Nathan & Associates; Menachem Nathan

(57) ABSTRACT

A Tele folded camera operative to compensate for an undesired rotational motion of a handheld electronic device that includes such a camera, wherein the compensation depends on the undesired rotational motion and on a point of view of the Tele folded camera.

21 Claims, 6 Drawing Sheets

(51) Int. Cl.
  *H04N 23/45* (2023.01)
  *H04N 23/55* (2023.01)
  *H04N 23/58* (2023.01)
  *H04N 23/61* (2023.01)
  *H04N 23/68* (2023.01)
  *H04N 23/698* (2023.01)
(52) U.S. Cl.
  CPC ............ *H04N 23/58* (2023.01); *H04N 23/61* (2023.01); *H04N 23/6812* (2023.01); *H04N 23/683* (2023.01); *H04N 23/698* (2023.01)

(56) References Cited

U.S. PATENT DOCUMENTS

| | | | |
|---|---|---|---|
| 5,032,917 A | 7/1991 | Aschwanden | |
| 5,041,852 A | 8/1991 | Misawa et al. | |
| 5,051,830 A | 9/1991 | von Hoessle | |
| 5,099,263 A | 3/1992 | Matsumoto et al. | |
| 5,248,971 A | 9/1993 | Mandl | |
| 5,287,093 A | 2/1994 | Amano et al. | |
| 5,394,520 A | 2/1995 | Hall | |
| 5,436,660 A | 7/1995 | Sakamoto | |
| 5,444,478 A | 8/1995 | Lelong et al. | |
| 5,459,520 A | 10/1995 | Sasaki | |
| 5,657,402 A | 8/1997 | Bender et al. | |
| 5,682,198 A | 10/1997 | Katayama et al. | |
| 5,768,443 A | 6/1998 | Michael et al. | |
| 5,926,190 A | 7/1999 | Turkowski et al. | |
| 5,940,641 A | 8/1999 | McIntyre et al. | |
| 5,982,951 A | 11/1999 | Katayama et al. | |
| 6,101,334 A | 8/2000 | Fantone | |
| 6,128,416 A | 10/2000 | Oura | |
| 6,148,120 A | 11/2000 | Sussman | |
| 6,208,765 B1 | 3/2001 | Bergen | |
| 6,268,611 B1 | 7/2001 | Pettersson et al. | |
| 6,549,215 B2 | 4/2003 | Jouppi | |
| 6,611,289 B1 | 8/2003 | Yu et al. | |
| 6,643,416 B1 | 11/2003 | Daniels et al. | |
| 6,650,368 B1 | 11/2003 | Doron | |
| 6,680,748 B1 | 1/2004 | Monti | |
| 6,714,665 B1 | 3/2004 | Hanna et al. | |
| 6,724,421 B1 | 4/2004 | Glatt | |
| 6,738,073 B2 | 5/2004 | Park et al. | |
| 6,741,250 B1 | 5/2004 | Furlan et al. | |
| 6,750,903 B1 | 6/2004 | Miyatake et al. | |
| 6,778,207 B1 | 8/2004 | Lee et al. | |
| 7,002,583 B2 | 2/2006 | Rabb, III | |
| 7,015,954 B1 | 3/2006 | Foote et al. | |
| 7,038,716 B2 | 5/2006 | Klein et al. | |
| 7,199,348 B2 | 4/2007 | Olsen et al. | |
| 7,206,136 B2 | 4/2007 | Labaziewicz et al. | |
| 7,248,294 B2 | 7/2007 | Slatter | |
| 7,256,944 B2 | 8/2007 | Labaziewicz et al. | |
| 7,305,180 B2 | 12/2007 | Labaziewicz et al. | |
| 7,339,621 B2 | 3/2008 | Fortier | |
| 7,346,217 B1 | 3/2008 | Gold, Jr. | |
| 7,365,793 B2 | 4/2008 | Cheatle et al. | |
| 7,411,610 B2 | 8/2008 | Doyle | |
| 7,424,218 B2 | 9/2008 | Baudisch et al. | |
| 7,509,041 B2 | 3/2009 | Hosono | |
| 7,533,819 B2 | 5/2009 | Barkan et al. | |
| 7,619,683 B2 | 11/2009 | Davis | |
| 7,738,016 B2 | 6/2010 | Toyofuku | |
| 7,773,121 B1 | 8/2010 | Huntsberger et al. | |
| 7,809,256 B2 | 10/2010 | Kuroda et al. | |
| 7,880,776 B2 | 2/2011 | LeGall et al. | |
| 7,918,398 B2 | 4/2011 | Li et al. | |
| 7,964,835 B2 | 6/2011 | Olsen et al. | |
| 7,978,239 B2 | 7/2011 | Deever et al. | |
| 8,115,825 B2 | 2/2012 | Culbert et al. | |
| 8,149,327 B2 | 4/2012 | Lin et al. | |
| 8,154,610 B2 | 4/2012 | Jo et al. | |
| 8,238,695 B1 | 8/2012 | Davey et al. | |
| 8,274,552 B2 | 9/2012 | Dahi et al. | |
| 8,390,729 B2 | 3/2013 | Long et al. | |
| 8,391,697 B2 | 3/2013 | Cho et al. | |
| 8,400,555 B1 | 3/2013 | Georgiev et al. | |
| 8,439,265 B2 | 5/2013 | Ferren et al. | |
| 8,446,484 B2 | 5/2013 | Muukki et al. | |
| 8,483,452 B2 | 7/2013 | Ueda et al. | |
| 8,514,491 B2 | 8/2013 | Duparre | |
| 8,547,389 B2 | 10/2013 | Hoppe et al. | |
| 8,553,106 B2 | 10/2013 | Scarff | |
| 8,587,691 B2 | 11/2013 | Takane | |
| 8,619,148 B1 | 12/2013 | Watts et al. | |
| 8,803,990 B2 | 8/2014 | Smith | |
| 8,896,655 B2 | 11/2014 | Mauchly et al. | |
| 8,976,255 B2 | 3/2015 | Matsuoto et al. | |
| 9,019,387 B2 | 4/2015 | Nakano | |
| 9,025,073 B2 | 5/2015 | Attar et al. | |
| 9,025,077 B2 | 5/2015 | Attar et al. | |
| 9,041,835 B2 | 5/2015 | Honda | |
| 9,137,447 B2 | 9/2015 | Shibuno | |
| 9,185,291 B1 | 11/2015 | Shabtay et al. | |
| 9,215,377 B2 | 12/2015 | Sokeila et al. | |
| 9,215,385 B2 | 12/2015 | Luo | |
| 9,270,875 B2 | 2/2016 | Brisedoux et al. | |
| 9,286,680 B1 | 3/2016 | Jiang et al. | |
| 9,344,626 B2 | 5/2016 | Silverstein et al. | |
| 9,360,671 B1 | 6/2016 | Zhou | |
| 9,369,621 B2 | 6/2016 | Malone et al. | |
| 9,413,930 B2 | 8/2016 | Geerds | |
| 9,413,984 B2 | 8/2016 | Attar et al. | |
| 9,420,180 B2 | 8/2016 | Jin | |
| 9,438,792 B2 | 9/2016 | Nakada et al. | |
| 9,485,432 B1 | 11/2016 | Medasani et al. | |
| 9,578,257 B2 | 2/2017 | Attar et al. | |
| 9,618,748 B2 | 4/2017 | Munger et al. | |
| 9,681,057 B2 | 6/2017 | Attar et al. | |
| 9,723,220 B2 | 8/2017 | Sugie | |
| 9,736,365 B2 | 8/2017 | Laroia | |
| 9,736,391 B2 | 8/2017 | Du et al. | |
| 9,768,310 B2 | 9/2017 | Ahn et al. | |
| 9,800,798 B2 | 10/2017 | Ravirala et al. | |
| 9,851,803 B2 | 12/2017 | Fisher et al. | |
| 9,894,287 B2 | 2/2018 | Qian et al. | |
| 9,900,522 B2 | 2/2018 | Lu | |
| 9,927,600 B2 | 3/2018 | Goldenberg et al. | |
| 11,190,689 B1* | 11/2021 | Wang | H04N 23/6811 |
| 2002/0005902 A1 | 1/2002 | Yuen | |
| 2002/0030163 A1 | 3/2002 | Zhang | |
| 2002/0063711 A1 | 5/2002 | Park et al. | |
| 2002/0075258 A1 | 6/2002 | Park et al. | |
| 2002/0122113 A1 | 9/2002 | Foote | |
| 2002/0167741 A1 | 11/2002 | Koiwai et al. | |
| 2002/0180759 A1* | 12/2002 | Park | H04N 23/698 |
| | | | 348/E7.086 |
| 2003/0030729 A1 | 2/2003 | Prentice et al. | |
| 2003/0093805 A1 | 5/2003 | Gin | |
| 2003/0160886 A1 | 8/2003 | Misawa et al. | |
| 2003/0202113 A1 | 10/2003 | Yoshikawa | |
| 2004/0008773 A1 | 1/2004 | Itokawa | |
| 2004/0012683 A1 | 1/2004 | Yamasaki et al. | |
| 2004/0017386 A1 | 1/2004 | Liu et al. | |
| 2004/0027367 A1 | 2/2004 | Pilu | |
| 2004/0061788 A1 | 4/2004 | Bateman | |
| 2004/0141065 A1 | 7/2004 | Hara et al. | |
| 2004/0141086 A1 | 7/2004 | Mihara | |
| 2004/0240052 A1 | 12/2004 | Minefuji et al. | |
| 2005/0013509 A1 | 1/2005 | Samadani | |
| 2005/0046740 A1 | 3/2005 | Davis | |
| 2005/0157184 A1 | 7/2005 | Nakanishi et al. | |
| 2005/0168834 A1 | 8/2005 | Matsumoto et al. | |
| 2005/0185049 A1 | 8/2005 | Iwai et al. | |
| 2005/0200718 A1 | 9/2005 | Lee | |
| 2006/0054782 A1 | 3/2006 | Olsen et al. | |
| 2006/0056056 A1 | 3/2006 | Ahiska et al. | |
| 2006/0067672 A1 | 3/2006 | Washisu et al. | |
| 2006/0102907 A1 | 5/2006 | Lee et al. | |
| 2006/0125937 A1 | 6/2006 | LeGall et al. | |
| 2006/0170793 A1 | 8/2006 | Pasquarette et al. | |
| 2006/0175549 A1 | 8/2006 | Miller et al. | |
| 2006/0187310 A1 | 8/2006 | Janson et al. | |
| 2006/0187322 A1 | 8/2006 | Janson et al. | |

(56) References Cited

U.S. PATENT DOCUMENTS

| | | |
|---|---|---|
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069224 A1* | 3/2012 | Cilia ............... G06V 20/56 348/240.99 |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2015/0370040 A1* | 12/2015 | Georgiev ............ H04N 23/698 359/833 |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0165111 A1* | 6/2016 | Uemura .................. G02B 7/08 348/208.11 |
| 2016/0198088 A1* | 7/2016 | Wang .................... B64C 39/024 348/36 |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0196238 A1* | 7/2018 | Goldenberg ............ G02B 13/16 |
| 2018/0198897 A1 | 7/2018 | Tang et al. |

(56) References Cited

U.S. PATENT DOCUMENTS

| | | |
|---|---|---|
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2019/0121216 A1 | 4/2019 | Shabtay et al. |
| 2019/0147606 A1* | 5/2019 | Zhuang .............. G06F 7/58 348/47 |
| 2019/0204084 A1* | 7/2019 | Song .................. G01C 21/165 |
| 2020/0221026 A1 | 7/2020 | Fridman et al. |

FOREIGN PATENT DOCUMENTS

| | | |
|---|---|---|
| CN | 102739949 A | 10/2012 |
| CN | 103024272 A | 4/2013 |
| EP | 1536633 A1 | 6/2005 |
| EP | 1780567 A1 | 5/2007 |
| EP | 2523450 A1 | 11/2012 |
| IN | 103841404 A | 6/2014 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 bages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Office Action in related KR patent application 2021-7038426, dated Jan. 15, 2022.

* cited by examiner

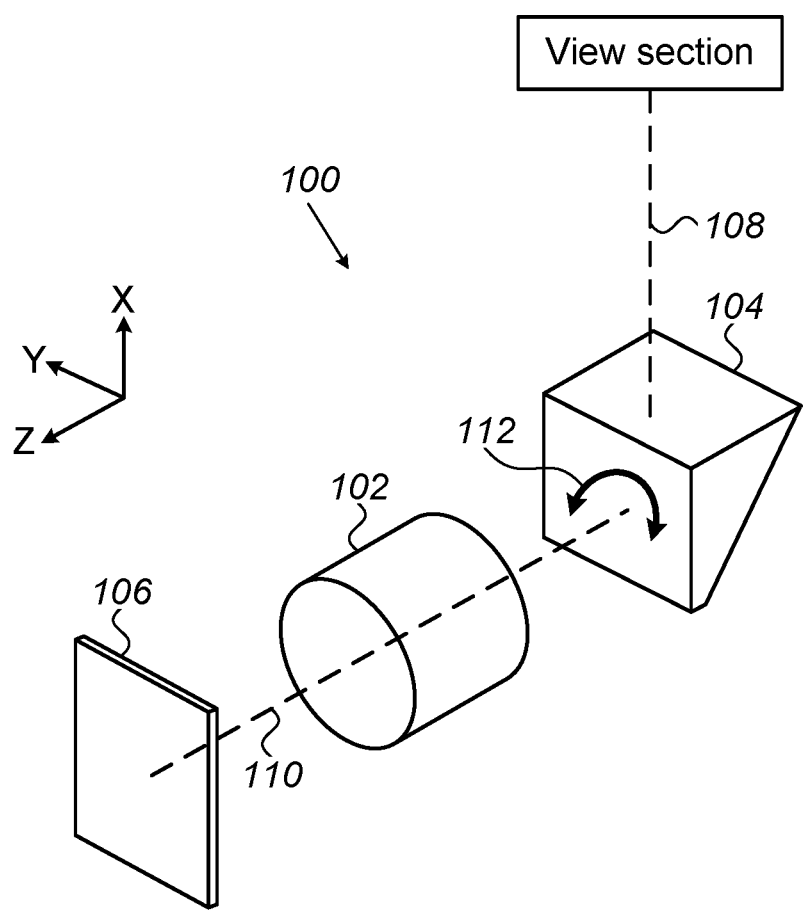
FIG. 1A    KNOWN ART

FIG. 1B     KNOWN ART

OPTICAL IMAGE STABILIZATION IN A SCANNING FOLDED CAMERA

CROSS REFERENCE TO RELATED APPLICATIONS

This application is a 371 of international application PCT/IB2021/056617 filed Jul. 22, 2021, and is related to and claims the benefit of priority from U.S. provisional patent application No. 63/064,565 filed Aug. 12, 2020, which is incorporated herein by reference in its entirety.

FIELD

Examples disclosed herein relate in general to digital cameras and in particular to correction of images obtained with folded digital cameras.

BACKGROUND

Compact digital cameras having folded optics, also referred to as "folded cameras" are known, see e.g. co-owned international patent application PCT/IB2016/057366. In handheld electronic devices (also referred to herein as "handheld devices") such as smartphones, tablets etc. a folded Tele camera is often part of a multi-camera and accompanied by one or more additional cameras, e.g. an Ultra-wide camera and a Wide camera. An Ultra-wide camera has a larger field of view ($FOV_{UW}$) than a Wide camera, which has a larger $FOV_W$ than a Tele camera having $FOV_T$ (assuming similar image sensor sizes).

FIG. 1A shows schematically a folded Tele camera numbered 100 from a perspective view. Camera 100 includes a lens 102 with a lens optical axis 110, an optical path folding element (OPFE) 104 and an image sensor 106. OPFE 104 folds a first optical path along an axis 108 substantially parallel to the X axis from an object, scene or panoramic view section 114 into a second optical path along an axis 110 substantially parallel to the Z axis. Camera 100 is designed to rotate OPFE 104 around axis 110 (the X axis) relative to the image sensor, i.e. in the Y-Z plane, a rotation indicated by an arrow 112. That is, folded Tele camera 100 is a "scanning" Tele camera ("STC"). FIG. 1B shows OPFE 104 after rotation by 30 degrees from the zero position.

FIG. 1C shows a handheld device 120 including a STC 100 having lens 102, OPFE 104 and image sensor 106 in a top view. A device normal ("N") is orthogonal to a screen 116 of device 120 and points towards the observer. The camera's optical axis is parallel to the X axis. In other examples, STC 100 may be included in 120 so that the camera's optical axis is parallel to the Y axis.

Images are acquired from a certain point of view (POV) of a camera. The POV is the direction defined by the vector that has the location of a camera's aperture as starting point and an object point at the center of the FOV as end point (see FIG. 3A, with two POV vectors 324 and 328 corresponding to two $FOV_T$s 326 and 332). Instead of POV vector, one may also speak of the FOV center direction vector (FOVCD). As an example, in spherical coordinates (r, θ, φ) defined according to the ISO convention, the POV for a camera at r=0 is defined by (1, θ, φ), with the polar angle θ and azimuthal angle φ defining the location of the object point at the center of the Tele FOV. The length of the POV vector may be 1 (unit vector) or may have some constant length (e.g. EFL) or may have a varying length e.g. so that it comes to lie on a specific plane.

As e.g. described in the co-owned PCT Patent Application No. PCT/IB2016/057366 and with reference to FIGS. 1A-1B, rotation of the OPFE may be performed around the X axis and around the Y axis for "scanning" with the FOV in 2 dimensions (2D) in FIGS. 1A-1B.

Modern cameras that are included in handheld devices often include optical image stabilization (OIS) for mitigating undesired camera motion caused by a user's hand motion (often referred to as "hand-shake"). For OIS, optical components are moved to reduce movements of imaged objects on a camera's image sensor. The lens module and/or the image sensor and/or the OPFE and/or the entire camera can be moved. An inertial measurement unit (IMU) included in the handheld device provides motion data along 6 degrees of freedom, namely and with reference to FIG. 1C, linear movements in X-Y-Z, roll "tilt about" (or "tilt around") the Z axis, yaw (tilt around the Y axis) and pitch (tilt around the X axis). Usually, OIS is provided for Pitch and Yaw rotation compensation only, and not for roll rotation, as Pitch and Yaw rotation account for the major share of image deterioration caused by hand-shake. Coordinate systems of the IMU, of a regular (i.e. a non-scanning) camera and of the including handheld device can be aligned and do not evolve in time. For a STC, this is not valid. The relation between a handheld device's coordinate system and that of a STC does change when FOV scanning is performed. Therefore, OIS as known in the art cannot be used for hand motion compensation in a STC.

There is a need for and it would be advantageous to have OIS for scanning Tele cameras.

SUMMARY

Henceforth and for simplicity, the terms "electronic device", "electronic handheld device" "handheld device" or just "device" are used interchangeably. Henceforth and for simplicity, the term "smartphone" may be used to represent all electronic handheld devices having scanning folded cameras and implementing methods for OIS in such cameras described herein.

In various embodiments, there are provided Tele folded cameras operative to compensate for an undesired rotational motion of a handheld electronic device that includes such a camera, wherein the compensation depends on the undesired rotational motion and on a point of view of the Tele folded camera.

In various embodiments, a handheld electronic device comprises: a Tele folded camera comprising an OPFE for folding light from a first optical path that forms an angle of less than 90 degrees to a normal of the device toward a second optical path substantially orthogonal to the normal of the device, a lens with a lens optical axis along the second optical path, and an image sensor, wherein the device is a handheld electronic device; an OPFE actuator for tilting the OPFE in one or more directions to direct a point of view (POV) of the Tele folded camera towards a segment of a scene; a motion sensor for sensing an undesired rotational motion of the device; and at least one actuator for moving at least one component of the Tele folded camera to compensate for the undesired rotational motion of the device, wherein the compensation depends on the undesired rotational motion of the device and on the Tele folded camera POV.

In some embodiments, the undesired rotation motion is around the device normal.

In some embodiments, a device further comprises a Wide camera having a field of view $FOV_W$ larger than a field of view $FOV_T$ of the Tele camera.

In some embodiments, the sensing the rotational motion includes measuring the rotation motion in three directions.

In some embodiments, the actuator for moving the component of the Tele folded camera to compensate for the device's undesired rotational motion is the OPFE actuator for tilting the OPFE in one or more directions to direct a point of view (POV) of the Tele folded camera towards a segment of a scene.

In some embodiments, the moving of the component of the Tele folded camera to compensate for the device's undesired rotational motion includes moving the lens.

In some embodiments, the moving of the component of the Tele folded camera to compensate for the device's undesired rotational motion includes moving the image sensor.

In some embodiments, a device further comprises a processing unit configured to perform a coordinate transformation to align coordinates of the Tele camera with coordinates of the handheld device or vice versa.

In some embodiments, a device further comprises a processing unit configured to perform a coordinate transformation that aligns coordinates of a reference coordinate system with coordinates of the handheld device and coordinates of the Tele camera.

In some embodiments, the coordinate transformation is performed using Rodrigues' rotation formula.

In some embodiments, the motion sensor includes an inertial measurement unit (IMU).

In some embodiments, a device further comprises a microcontroller unit (MCU) configured to read out the motion sensor and to provide control signal to the rotational motion compensation actuator. In some embodiments, the MCU is included in an application processor (AP).

In some embodiments, a device further comprises an application processor configured to provide POV control signal to the OPFE actuator for tilting the OPFE.

In various embodiments, there are provided methods comprising: providing a handheld device comprising a Tele folded camera that includes an OPFE for folding light from a first optical axis that forms an angle of less than 90 degrees to a normal of the device toward a second optical axis substantially orthogonal to a normal of the device, a lens with a lens axis along the second optical axis, and an image sensor; providing an OPFE actuator for tilting the OPFE in one or more directions to direct a point of view (POV) of the Tele folded camera towards a segment of a scene; sensing an undesired rotational motion of the device; and compensating for the undesired rotational motion, wherein the compensation depends on the undesired rotational motion and on the Tele folded camera's POV.

In some embodiments, the compensating for the undesired rotational motion includes moving a component of the Tele folded camera.

In some embodiments, the compensating for the undesired rotational motion includes compensating for a rotational motion around the device's normal direction.

In some embodiments, a method further comprises performing a coordinate transformation to align coordinates of the Tele camera with coordinates of an IMU.

In some embodiments, a method further comprises performing a coordinate transformation to coordinates of the IMU with coordinates of the Tele camera.

In some embodiments, a method further comprises performing a coordinate transformation to align coordinates of a reference coordinate system with coordinates of the IMU and coordinates of the Tele camera.

In some embodiments, the performing the coordinate transformation includes performing the transformation using Rodrigues' rotation formula.

In some embodiments, the sensing an undesired rotational motion of the device includes sensing the undesired rotational motion in three directions.

In some embodiments, the compensating for the undesired rotational motion of the device includes rotating the OPFE.

In some embodiments, the compensating for the undesired rotational motion of the device includes moving the lens.

In some embodiments, the compensating for the undesired rotational motion of the device includes moving the image sensor.

In some embodiments, the compensating for the undesired rotational motion includes calculating a changed POV caused by the undesired rotational motion in the X direction by using the equation: $P^F{}_P = (P^I \cdot \cos(\text{hnd\_pitch}) + \text{cross}(P^I, R_P) \cdot \sin(\text{hnd\_pitch}) + R_P \cdot (\text{dot}(P^I, R_P)(1-\cos(\text{hnd\_pitch}))))$.

In some embodiments, the compensating for the undesired rotational motion includes calculating a changed POV caused by the undesired rotational motion in the Y direction by using the equation: $P^F{}_Y = (P^I \cdot \cos(\text{hnd\_yaw}) + \text{cross}(P^I, R_Y) \cdot \sin(\text{hnd\_yaw}) + R_Y \cdot (\text{dot}(P^I, R_Y) \cdot (1-\cos(\text{hnd\_yaw}))))$.

In some embodiments, the compensating for the undesired rotational motion includes calculating a changed POV caused by the undesired rotational motion in the X direction by using the equation: $P^F{}_R = (P^I \cdot \cos(\text{hnd\_roll}) + \text{cross}(P^I, R_R) \cdot \sin(\text{hnd\_roll}) + R_R \cdot (\text{dot}(P^I, R_R) \cdot (1-\cos(\text{hnd\_roll}))))$.

In some embodiments, the compensating for the undesired rotational motion includes calculating a direction of a changed POV caused by the undesired rotational motion in X, Y and Z direction together by using the equation: $P^F{}_* = P^I + (P^I - P^F{}_P) + (P^I - P^F{}_Y) + (P^I - P^F{}_R)$.

In some embodiments, the compensating for the undesired rotational motion includes calculating a vector of a changed POV caused by by the undesired rotational motion in X, Y and Z direction together by using the equation: $P^{F_1} P^{F_1} \cdot EFL_T / P^{F_1}{}_z$.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

FIG. 1A shows schematically a known folded scanning camera from a perspective view;

FIG. 1B shows the OPFE in the Tele camera of FIG. 1A after rotation by 30 degrees from a zero position;

DETAILED DESCRIPTION

Figure 1C:
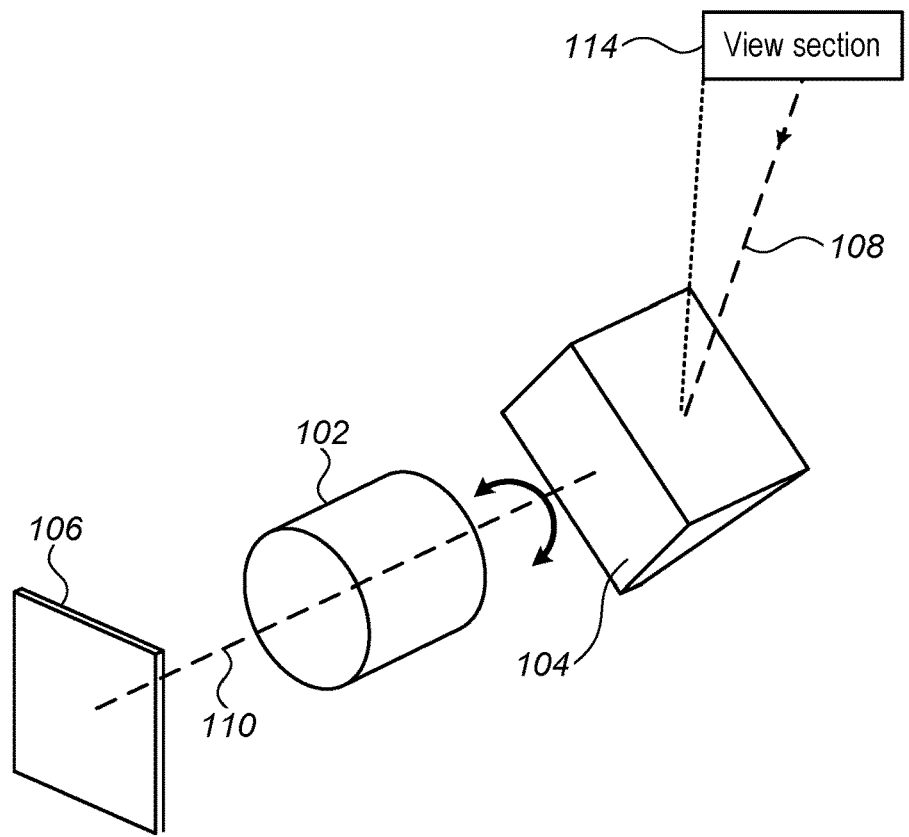
FIG. 1C shows a scanning camera such as shown in FIGS. 1A-B integrated as a "rear" or "world-facing" camera in a smartphone.
Figure 1C:
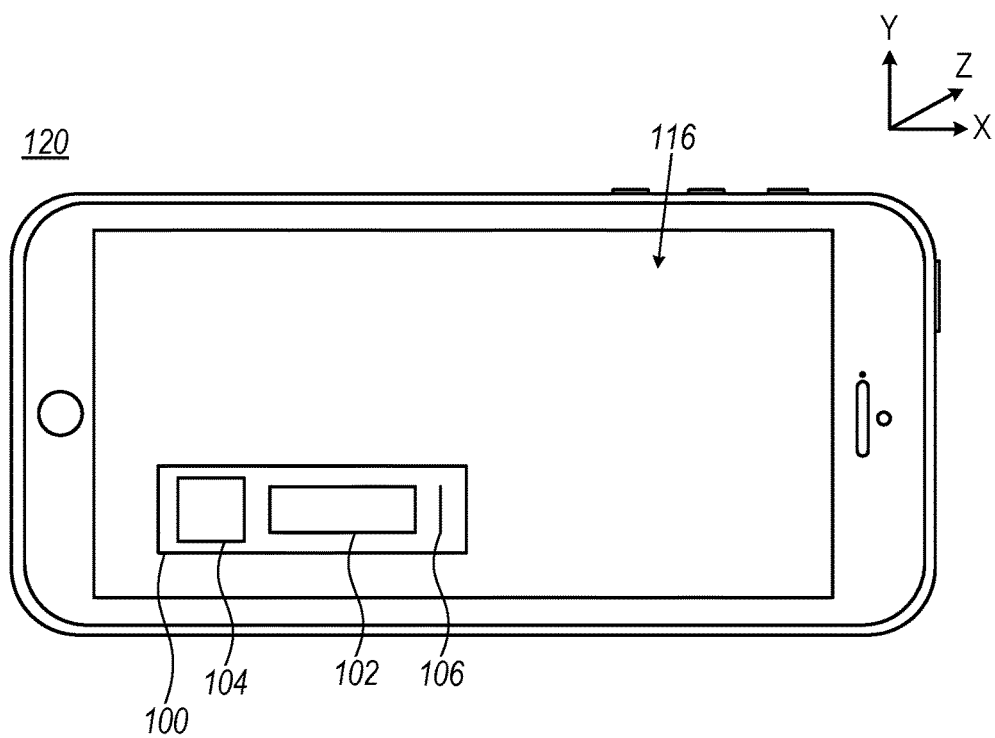
Figure 2A:
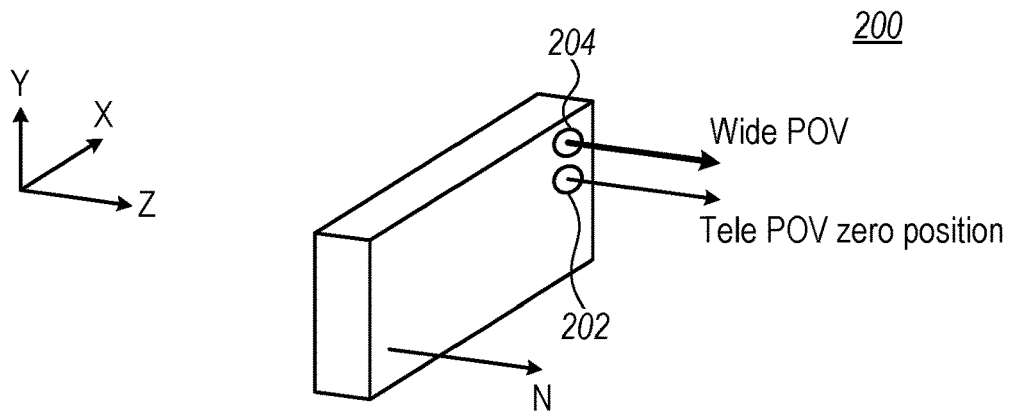
FIG. 2A shows exemplarily a smartphone including a first, scanning Tele camera at a zero position, as well as a second, Wide camera.

FIG. 2A shows exemplarily a smartphone 200 comprising a STC 202 at a zero position, and a Wide camera 204. Wide camera 204 is not a scanning camera and its POV ("$POV_W$") is parallel to a device normal N (parallel to Z-axis) of the smartphone. Device normal N is parallel (or anti-parallel) to a normal onto a surface of smartphone 200 that has the largest area. A coordinate system of the IMU of smartphone 200 (such as IMU 460 in FIGS. 4A and 4B, not shown here) may be aligned with a coordinate system of smartphone 200 such as the coordinate system shown in FIG. 2A, where the three axes of the coordinate system are parallel to the three symmetry axes of smartphone 200, so that the Z axis of the IMU's (and smartphone 200's) coordinate system is parallel to $POV_W$. The POV of STC 202 ("$POV_T$") is directed its zero position ("$POV_{T,0}$"), corresponding to an OPFE rotation state such as shown in FIG. 1A. With $POV_T$ at zero position, the coordinate systems of IMU, Wide camera 204 and STC 202 align.

In a first exemplary method for OIS ("Example 1"), consider OIS for Wide camera 204 that (for the sake of simplicity) may correct for pitch rotation only. For detecting the amount of undesired hand motion, one could read out the value for pitch rotation around the X axis from the IMU ("$X_{IMU}$") and move e.g. the lens in one particular direction ($dir_1$) by a particular amount, wherein the amount (or stroke) of movement is proportional to $X_{IMU}$, i.e. the lens stroke $S_W$ fulfills $S_W = C_W \cdot X_{IMU}$ (with some constant $C_W$). The same holds for OIS of STC 202 at zero position. By moving the lens by $S_T = C_T \cdot X_{IMU}$ (with some constant $C_T$) in din the hand motion is compensated.

Figure 2B:
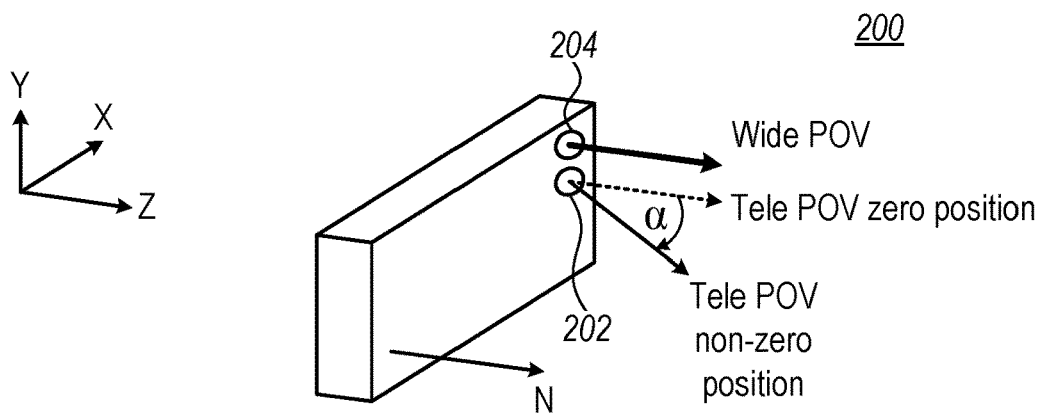
FIG. 2B shows the smartphone of FIG. 2A with the Tele camera at a non-zero position.

FIG. 2B shows smartphone 200 with STC 202 at a non-zero position. $POV_T$ has an angle of α degrees with respect to $POV_W$. For example, for α=30 degrees, this corresponds to an OPFE rotation state such as shown in FIG. 1B. The coordinate systems of IMU, Wide camera 204 and STC 202 do not align anymore.

Consider Example 1 (hand motion in pitch direction) with STC 202 at a non-zero position. OIS for Wide camera 204 may be performed as in Example 1. However, for OIS of STC 202, the method of Example 1 does not allow to perform hand motion compensation anymore, i.e. there is (in general) no $C_T$ so that by moving the Tele lens by $S_T = C_T \cdot X_{IMU}$, the hand motion is compensated. This is because the coordinate systems of STC 202 and the IMU are not aligned anymore.

Figure 2C:
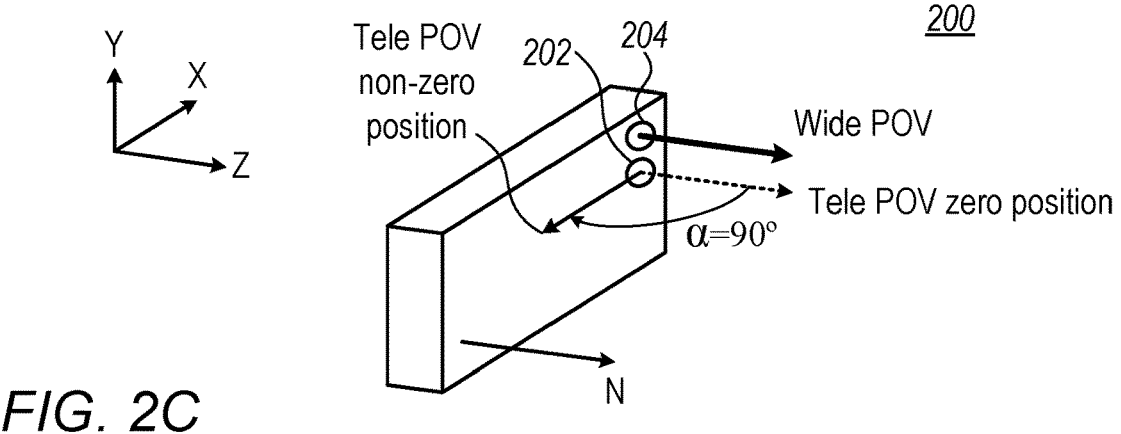
FIG. 2C shows the smartphone of FIG. 2A with the Tele camera at another non-zero position.

For a second exemplary method for OIS ("Example 2"), refer to FIG. 2C. Compared to FIG. 2A, $POV_T$ is rotated by 90 degree around the Y axis, i.e. $POV_T$ and $POV_W$ are perpendicular to each other. As in Example 1, we consider OIS for the Wide camera for correction of pitch rotation only. Hand motion can be fully compensated by reading the IMU's value for rotation $X_{IMU}$ and by moving a lens of the Wide camera (not shown) by $S_W = C_W \cdot X_{IMU}$ (with some constant $C_W$) in $dir_1$. However, the hand motion cannot be compensated by moving a lens of the STC (not shown, but similar to lens 102) by $S_T = C_T \cdot X_{IMU}$ (with some constant $C_T$) in $dir_1$. Instead, the rotation direction must be modified from din to a particular direction $dir_2$ which is different from $dir_1$. The hand motion can be compensated by moving the STC lens by $S_T = C_T \cdot X_{IMU}$ in $dir_2$. In general, for a STC the OIS axes depend on the POV or scanning state of the STC and are thus not constant, as it is the case for a Wide camera.

Figure 3A:
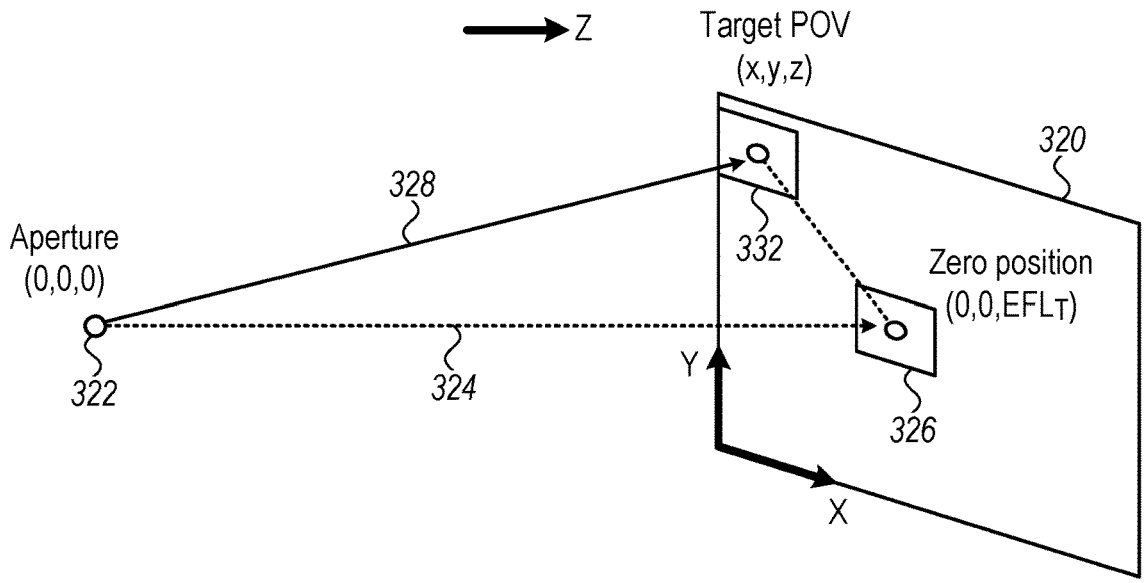
FIG. 3A shows a 2-dimensional (2D) chart used to derive a coordinate system for the Tele camera.

FIG. 3A shows a 2-dimensional (2D) chart 320 for deriving a coordinate system for a STC. An aperture 322 of the STC is located at coordinates (0, 0, 0). A zero state STC $POV_T$ ($POV_{T,0}$) 324 corresponds to a first optical path which is parallel to a device normal N (see FIGS. 2A-C) and may have the coordinates (0, 0, $EFL_T$), with $EFL_T$ being the EFL of the STC. $FOV_T$ 326 corresponds to the $FOV_T$ of the STC at $POV_{T,0}$ 324. A desired or target $POV_T$ 328 ("$POV_{T,T}$") with corresponding $FOV_T$ 332 is shown as well.

Figure 3B:
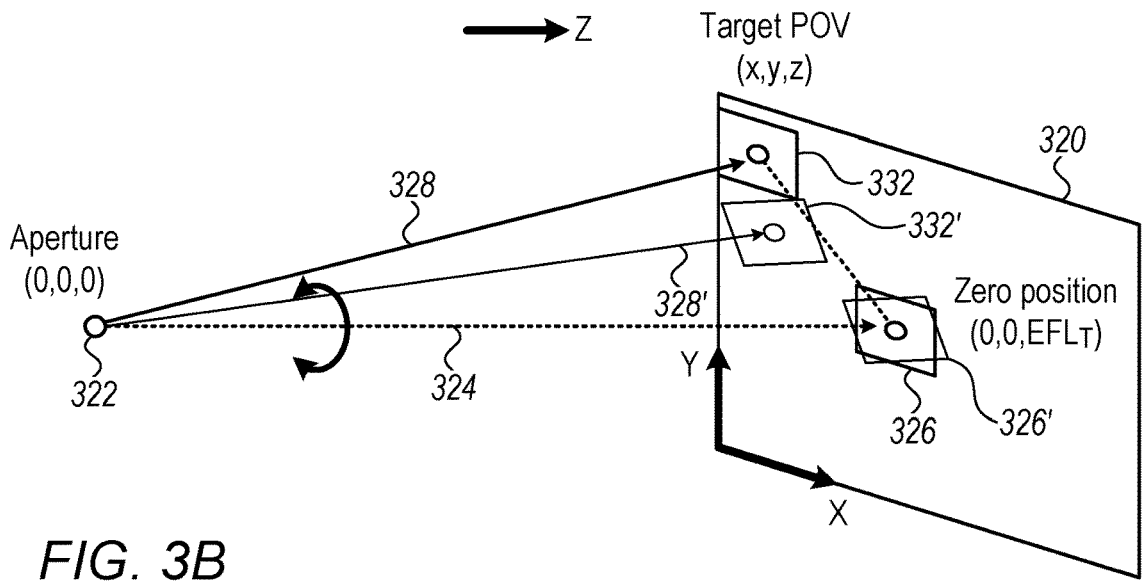
FIG. 3B shows impact of rotational device motion caused by hand shake on the 2D chart of FIG. 3A.

FIG. 3B shows 2D chart 320 of FIG. 3A after the handheld device that includes the STC underwent a rotational "roll" motion around the Z axis, e.g. because of a user's hand motion. $POV_{T,0}$ 324 did not undergo any change. However, the corresponding $FOV_T$ changed to a rotated $FOV_T$ 326'. In contrast, the rotational motion changed $POV_{T,T}$ 328 to $POV_{T,T}$ 328'. The change of a POV such as $POV_{T,T}$ 328 in response to a rotational device motion depends not only on the angle or amount of rotation, but also on the position of $POV_T$.

Figure 3C:
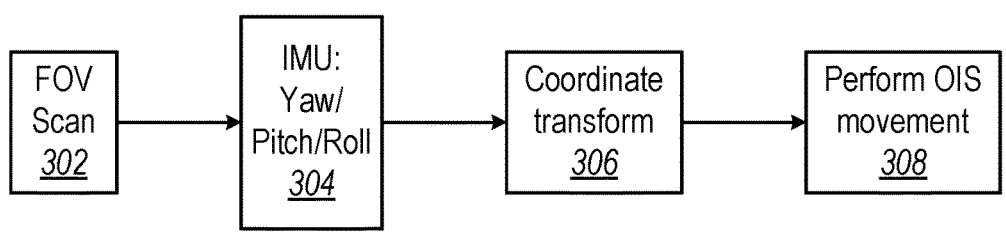
FIG. 3C shows in a flow chart main steps of a method for scanning Tele camera OIS disclosed herein.

FIG. 3C shows in a flow chart main steps of a method for STC OIS disclosed herein.

Figure 4A:
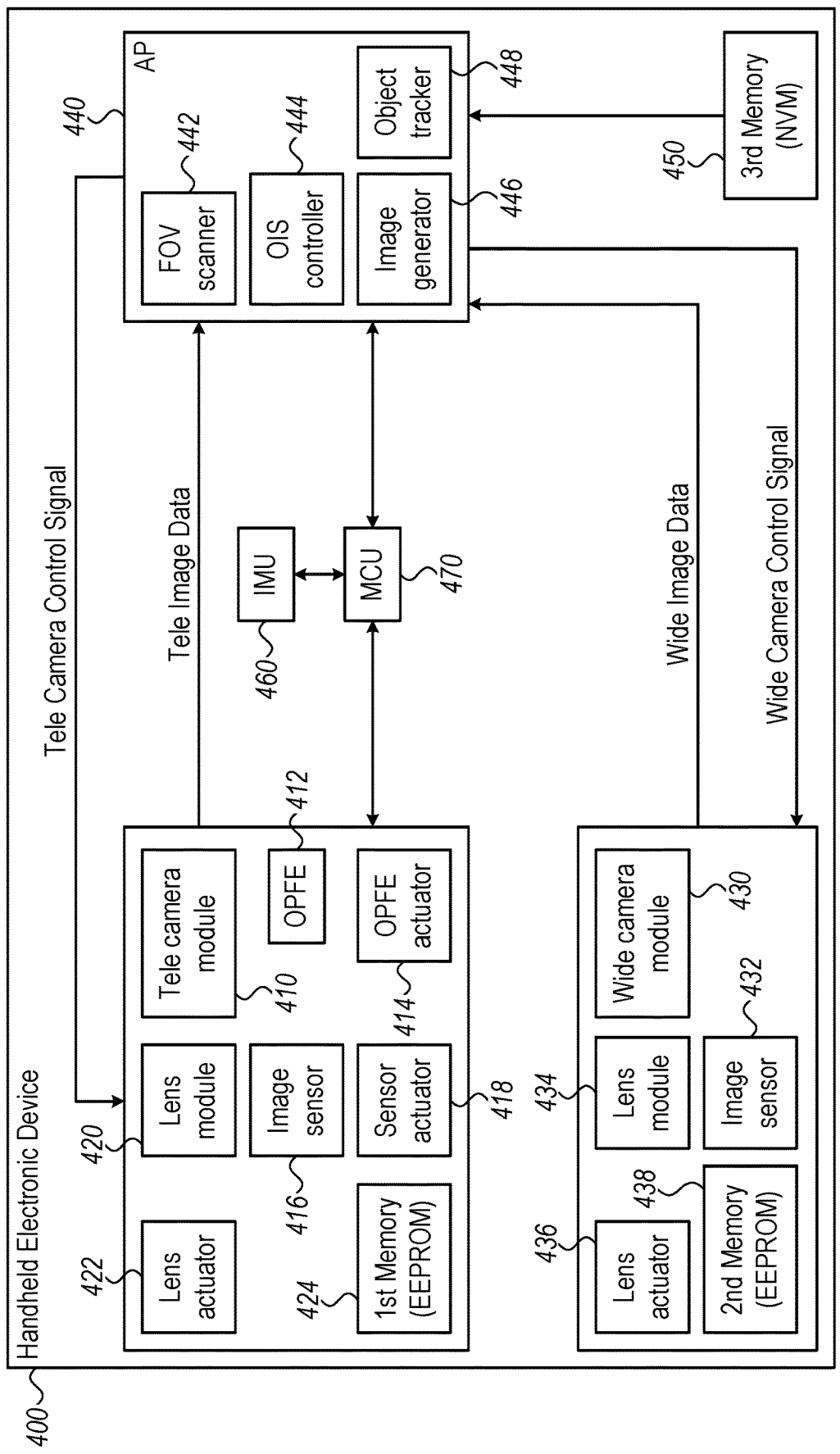
FIG. 4A shows schematically in a block diagram an embodiment of a handheld device that includes multi-aperture cameras with at least one scanning Tele camera disclosed herein.

In a first step 302, a command triggered by a human user or by a program and processed by a FOV scanner 442 (FIG. 4A) directs $FOV_T$ to a region of interest (ROI) within a scene. The scanning may be performed by rotating an OPFE with an OPFE actuator 414 (FIG. 4A). The FOV scanning by OPFE rotation is not performed instantaneously, but requires some settling time, which may be about 1-50 ms for scanning 2-5 degrees and about 5-500 ms for scanning 10-45 degrees. After the settling time, the STC is operational for capturing Tele images. The STC may be focused to an object by a user command or autonomously. The STC's scanning direction may be given by an initial (or target) POV vector $P^T$.

In step 304, the IMU is read out and provides rotational movements around the Pitch, Yaw and Roll directions, i.e. $X^{IMU}$, $Y^{IMU}$ and $Z^{IMU}$ respectively. Usually, IMU provides data on the angular acceleration which is to be integrated for determining the rotation angle. The IMU data may be used to calculate the undesired rotational motion of the device.

In step 306, a coordinate transformation is performed. The coordinate transformation is required because the STC's POV change caused by an undesired rotational motion of the device and the sensing of the undesired rotational motion occur in different coordinate systems.

A processing unit such as an AP or a MCU may be configured for performing the coordinate transformation (e.g. AP 440 of device 400 or device 480, or MCU 470 of device 400 in FIG. 4A). In some examples, an AP or MCU may solve the below equations analytically, or AP or MCU may use a polynomial fit or a linear fit for solving the equations approximately. In other examples, the AP or MCU may not perform calculations but use a Look Up Table (LUT) for coordinate transformation. In some examples and such as e.g. shown in FIG. 4A, the coordinate transformation may be performed by a MCU such as MCU 470 connected to the STC module 410.

In some examples, the transformation may be performed in order to express the coordinates of the STC in the coordinate system of the IMU. Device rotations and compensation motions may then be calculated in the IMU's coordinate system.

In some examples, a 2D chart such as chart 320 shown in FIG. 3B may be used to express the coordinates of the STC in the IMU's coordinate system. Chart 320 may resemble a calibration chart for calibrating the STC or for calibrating a dual-camera, e.g. including a Tele camera and a Wide camera. STC aperture 322 may be located at (0, 0, 0). The handheld device may be pointed towards chart 320 in "landscape" direction, i.e. with reference to the coordinate system of FIG. 3B, the long side of a smartphone as shown in FIG. 1C may be parallel to the X axis and the short side parallel to the Y axis, with the STC aperture pointing towards the chart in Z direction. All POVs that the STC can reach are given by "POV vectors" or "camera pointing vector" P which are pointing to coordinates lying on chart 320. The coordinates of the zero state position may be (0, 0, $EFL_T$) with $EFL_T$ being the EFL of the STC. At zero position, the coordinates of the IMU (and of the handheld device) overlap with the STC's coordinates.

If the STC is directed to a non-zero POV, a coordinate transform from the IMU's to the STC's coordinates must be performed. In some examples, Rodrigues' rotation formula may be used. The IMU's pitch/yaw/roll rotation values may be named "hnd_pitch", "hnd_yaw" and "hnd_roll". IMU provides hnd_pitch, hnd_yaw and hnd_roll in a coordinate system having the following unit vectors:

Pitch unit vector $R_P$: $R_P$=(1, 0, 0),
Yaw unit vector $R_Y$: $R_Y$=(0, 1, 0),
Roll unit vector $R_R$: $R_R$=(0, 0, 1).

In general, OIS corrects small angles only. Therefore, in some situations and approximately, one may treat the pitch/yaw/roll rotations independently. For any (slight) rotation of the device, Rodrigues' rotation formula may be applied to pitch/yaw/roll rotations independently, wherein the (slight) rotation may be represented by the sum over the pitch/yaw/roll rotations. A hand motion only by hnd_pitch, or only by hnd_yaw or only by hnd_roll (in the IMU's coordinates $R^P$, $R^Y$ and $R^R$) applied to any initial POV vector $P^I$ may result in the following final POV vector $P^F$ ("cross(x, y)" indicates the cross product of vectors x and y, "dot(x, y)" indicates the dot product of vectors x and y):

POV vector $P^F_P$ after rotation by hnd_pitch around $R_P$ (hnd_yaw, hnd_roll=0): $P^F_P$=($P^I$·cos(hnd_pitch)+cross($P^I$, $R^P$)·sin(hnd_pitch)+$R^P$·(dot($P^I$, $R^P$)·(1-cos(hnd_pitch))));

POV vector $P^F_Y$ after rotation by hnd_yaw around $R_Y$ (hnd_pitch, hnd_roll=0): $P^F_Y$=($P^I$·cos(hnd_yaw)+cross($P^I$, $R^Y$)·sin(hnd_yaw)+$R^Y$(dot($P^I$, $R^Y$)·(1-cos(hnd_yaw))));

POV vector $P^F_R$ after rotation by hnd_roll around $R_R$(hnd_pitch, hnd_yaw=0): $P^F_R$=($P^I$·cos(hnd_roll)+cross($P^I$, $R^R$)·sin(hnd_roll)+$R^R$(dot($P^I$, $R^R$)·(1-cos(hnd_roll)))).

For small angles, a final POV vector (before normalization) $P^{F'}$ that underwent both Pitch, Yaw and Roll rotations may be given by:

$$P^{F'}=P^I+(P^I-P^F_P)+(P^I-P^F_Y)+(P^I-P^F_R)$$

A normalization may be performed in order to ensure that the final POV vector $P^F$ comes to lie on chart 320. In some examples, $P^F$ may be obtained by normalizing $P^{F'}$ with $EFL_T/P^{F'}_z$, wherein $P^{F'}_z$ is the z-component of $P^{F'}$, i.e.:

$$P^F=P^{F'}·EFL_T/P^{F'}_z.$$

From the above equations it is evident that for compensating for undesired rotational hand motion in a STC, in contrast for a non-scanning camera like e.g. Wide camera 204, where one may compensate the undesired rotational hand motion around yaw and pitch only, one must compensate rotational hand motion around the three directions yaw, pitch and roll.

In other examples for coordinate transformation, the transformation may be performed to express the coordinates of the IMU in the coordinate system of the STC. Hand motion rotations and compensation motions may then be calculated in the STC's coordinate system. As above, Rodrigues' rotation formula may be used.

In yet other examples for coordinate transformation, the transformation may be to a third coordinate system ("reference system"). Both the coordinates of the STC and of the IMU are expressed in the reference coordinate system. Hand motion rotations and compensation motions may then be calculated in the reference coordinate system. As above, Rodrigues' rotation formula may be used.

In step 308, movement for OIS may be performed. In some examples, OIS may be performed by moving the STC's OPFE. In other examples, a lens such as lens 102 and/or an image sensor such as image sensor 106 may be moved for OIS. Assuming ideal OIS, the movement of OPFE and/or lens and/or sensor may lead to a POC vector modification $P_{OIS}$ that exactly cancels the effect of the hand motion onto the POV vector, i.e.: $P^F+P^{OIS}=P^I$. So after performing step 308 the STC is again directed towards $P^I$. In other examples, the entire STC may be moved for OIS. I.e. OPFE, lens and image sensor are moved together as one unit for OIS.

In some embodiments, steps 304-308 may be repeated for stabilizing the STC continuously. The OIS cycles that include steps 304-308 may be performed at frequencies of e.g. 500 Hz-100 kHz. STC images or image streams are captured while the above OIS method is performed.

In some embodiments, an IMU may be fixedly attached to the OPFE, so that when moving the OPFE, the IMU moves accordingly, too. This allows for using coordinate systems having identical basis vectors for both the STC and the IMU, so that the coordinate transform of step 306 is not required.

In some embodiments, a sensor actuator may actuate the image sensor for correcting POV aberrations of a STC image. As described in the co-owned international patent application PCT/IB2021/056311, a STC image undergoes POV aberrations. One aberration is a rotation of the STC image on the image sensor ("rotational POV aberration"). When an undesired rotational hand motion is compensated by moving an OPFE as disclosed herein, the moving of the OPFE introduces a POV aberration. A sensor actuator may be used to rotate an image sensor around a normal of the image sensor for compensating the rotational POV aberration.

FIG. 4A shows schematically an embodiment of a handheld device numbered 400 and including multi-aperture cameras with at least one STC disclosed herein. Device 400 comprises a STC module 410 that includes an OPFE 412 as well as an OPFE actuator 414 for FOV scanning and/or OIS, and a Tele lens module 420 that forms a Tele image recorded by an image sensor 416. A Tele lens actuator 422 may move lens module 420 for focusing and/or OIS. Handheld device 400 may further comprise an application processor (AP) 440 that includes a FOV scanner 442, an OIS controller 444, an image generator 446 and an object tracker 448.

In other examples, device 400 may comprise a STC that includes two OPFEs as well as an OPFE actuator for each of the two OPFEs. In some examples, the OPFE actuators may actuate the OPFEs for performing OIS as disclosed herein. In other examples, a lens actuator may actuate a lens or a sensor actuator may actuate a sensor for performing OIS as disclosed herein. A STC camera based on two OPFEs is described for example in PCT/IB2021/054186. In such a STC, the optical path within the camera is folded twice, so that one speaks of a double-folded scanning Tele camera.

Handheld device 400 further comprises a Wide (or Ultra-Wide) camera module 430 which includes a second lens module 434 that forms an image recorded by a second image sensor 432. A second lens actuator 436 may move lens module 434 for focusing and/or OIS. In some examples, the STC can scan the entire $FOV_W$ or an even larger FOV. In other examples, the STC can scan a FOV that is smaller than $FOV_W$.

In some examples, object tracker 448 may be configured to track an object in $FOV_W$ and provide tracking data to FOV scanner 442 and/or the OIS controller 444. Based on the tracking data, FOV scanner 442 and/or the OIS controller 444 may provide control signals to OPFE actuator 414 which actuate an OPFE rotation for tracking an object with the STC. As an example, one may track an object so that it centers at the center of $FOV_T$. Examples 3-7 described below refer to this tracking scenario, where the Wide camera image data is used to provide tracking information which triggers Tele FOV scanning.

In some examples, tracking information and OIS information may interfere and coordination between tracking and OIS may be required for achieving a desired object tracking and/or OIS outcome.

As a third exemplary method for OIS, consider a device such as device 400 or 480 including a Wide camera and a STC both not having OIS. The STC may track an object at rest so that the object's center is located at the center of $FOV_T$. The tracking may occur in real-time (RT), i.e. we assume that there is no delay between the detection of a tracking deviation and its compensation. A device's rotational motion caused by a user's hand motion will be detected as an object movement in the Wide camera. In response, a tracking movement of the STC will be triggered and the object's location in the Tele FOV will be updated. In conclusion, in the RT scenario the object tracker performs OIS in a sense that the object will always be located in the center of $FOV_T$ and will not be affected from hand motion of a user.

As a fourth exemplary method for OIS, consider a device such as device 400 or 480 including a Wide camera not having OIS and a STC having OIS. As in example 3, we assume RT object tracking on $FOV_W$ so that a (non-moving) object's center is located at the center of $FOV_T$. OIS may be performed in RT as well. A device's rotational motion caused by a user's hand motion will be detected as an object movement in the Wide camera. In response, a tracking movement $\Delta T$ for the STC will be triggered. Simultaneously, the device's rotational motion will also be detected by the STC's OIS and an OIS movement $\Delta OIS$ of the STC will be triggered in response. OIS movement may be performed according the OIS method disclosed herein. $\Delta T$ and $\Delta OIS$ are identical in terms of direction and magnitude, i.e. a STC movement of $2 \cdot \Delta T = 2 \cdot \Delta OIS$ will be triggered, which is double the amount of movement required (i) for keeping the object at the center of $FOV_T$ (desired tracking outcome) and (ii) for suppressing the impact of hand motion on the STC image (desired OIS outcome). In conclusion, the desired outcome is not achieved for either Tele tracking or Tele OIS. Therefore, in some examples, the STC's OIS is disabled when using object tracking.

As a fifth exemplary method for OIS, consider a device such as device 400 or 480 including a Wide camera not having OIS and a STC having OIS. Object tracking may be performed on $FOV_W$ so that a (non-moving) object's center is located at the center of $FOV_T$. However, Object tracking and OIS may not be performed in RT. In general, OIS is performed at higher frequencies than object tracking. As an example, OIS may be performed at 500 Hz-100 kHz and object tracking may be performed at 1 Hz-100 Hz. In some examples, for preventing undesired interference between OIS and object tracking, one may disable OIS when using object tracking. In other embodiments, one may separate control of OIS and object tracking in the frequency domain. As an example, for device's rotational motion caused by a user's hand motion that occurs at a frequency higher than e.g. 30 Hz, one may use OIS for device motion correction. For frequencies lower than e.g. 30 Hz one may not use OIS for device motion correction. Instead the low frequency device motion will be compensated by the object tracker.

As a sixth exemplary method for OIS, consider a device such as device 400 or 480 including a Wide camera having OIS and a STC not having OIS. Object tracking may be performed on $FOV_W$ so that a (non-moving) object's center is located at the center of $FOV_T$. Object tracking and OIS may be performed in RT. As of the Wide camera's OIS, a device's rotational motion caused by a user's hand motion will have no impact on the Wide image stream. As the object does not move in $FOV_W$, no tracking movement of the STC will be triggered. In conclusion, there is no hand motion compensation and the object will not be located at the center of $FOV_T$ anymore, leading to an undesired object tracking outcome. In some examples for preventing this undesired outcome, one may disable the Wide camera's OIS when performing object tracking. In other examples, object tracking control signals that are supplied to the STC may additionally include the Wide camera's OIS control signals. By superimposing the two signals, the benefits of both Wide camera OIS and proper STC tracking may be enjoyed.

As a seventh exemplary method for OIS, consider a device such as device 400 or 480 with both the Wide camera and the STC having OIS. We assume RT tracking so that an object's center is located at the center of $FOV_T$. A device's rotational motion caused by a user's hand motion will be corrected by an OIS movement in both the Wide camera and the STC in RT. In conclusion, a user's hand motion will not impact the desired output of the object tracker.

Calibration data may be stored in a first memory 424, e.g. in an EEPROM (electrically erasable programmable read only memory) and/or in a second memory 438 and/or in a third memory 450 such as a NVM (non-volatile memory). The calibration data may comprise calibration data between Wide camera 430 and STC 410. The calibration data may further comprise calibration data between an OPFE's position and the STC's corresponding POV.

Handheld device 400 further comprises an inertial measurement unit (IMU, for example a gyroscope) 460 that supplies motion information of 400. For example, a microcontroller unit (MCU) 470 may be used to read and process data of IMU 460. In some examples, the MCU may be controlled by an OIS controller 444 which is part of AP 440. In some examples, step 304 and step 306 may be performed by the MCU and step 308 may be performed by OPFE actuator 414 (and/or lens actuator 436 and/or sensor actuator 418 in case OIS is performed by lens shift or sensor shift respectively). In some examples, MCU 470 may be integrated into AP 440.

Figure 4B:
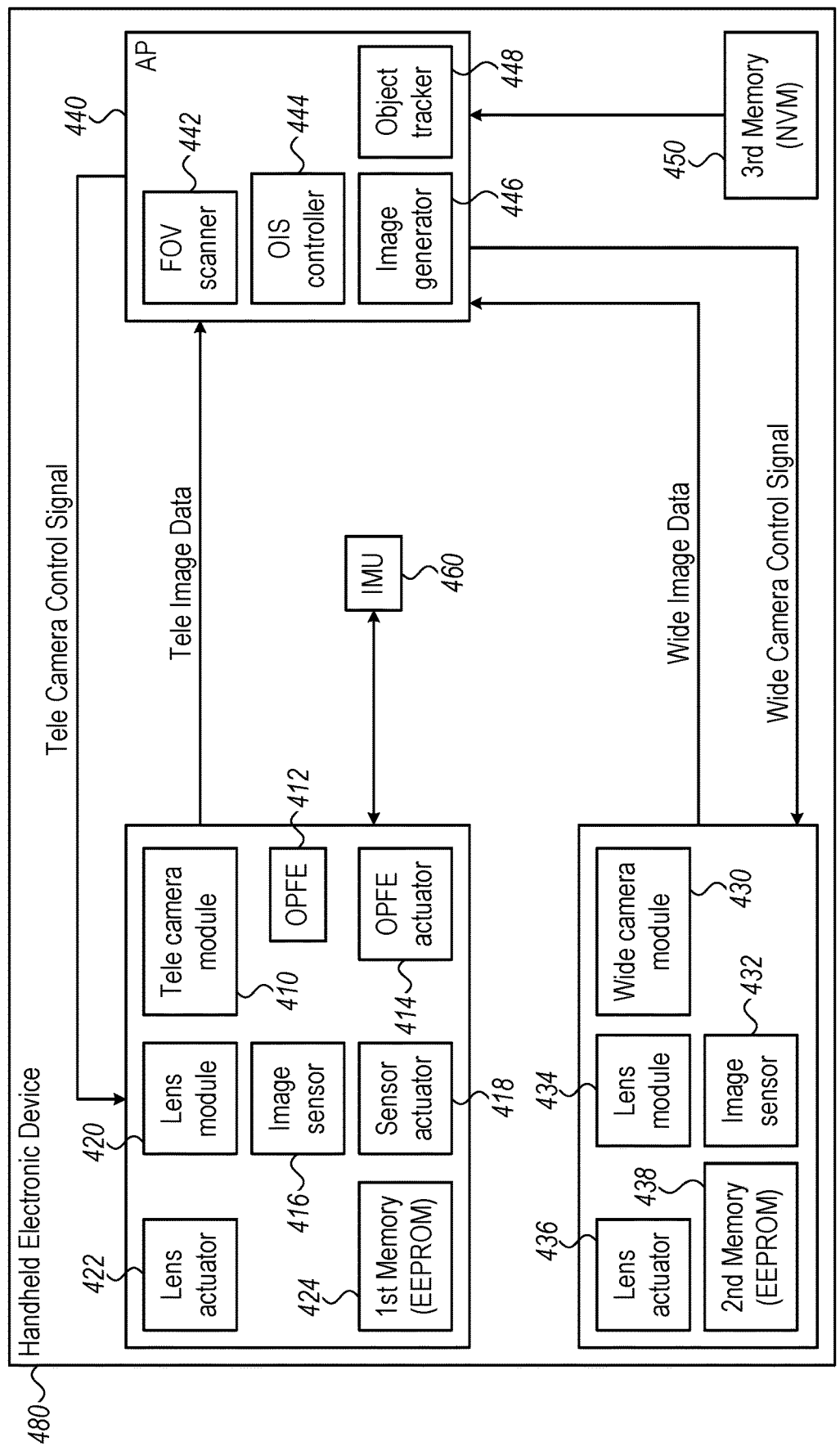
FIG. 4B shows schematically in a block diagram another embodiment of a handheld device that includes multi-aperture cameras with at least one scanning Tele camera disclosed herein.

Another embodiment of a handheld device numbered 480 and comprising a multi-aperture camera with at least one STC as disclosed herein is shown in FIG. 4B. An MCU (not shown) for reading and processing motion data from IMU 460 and for supplying OIS control signals may be included into STC module 410, e.g. into the driver of OPFE actuator 414.

In some examples, additional data may be used for hand motion estimation. Additional data may e.g. be image data from the Wide camera 430 or data from additional sensing units present in the handheld device.

In some examples, image data from Wide camera 430 may be used to estimate an "optical flow" from a plurality of images as known in the art, wherein OIS controller 444 may use the data of the optical flow together with data from IMU 460 for estimating motion of device 400. In other examples, only optical flow data estimated from image data of camera 410 and/or camera 430 may be used for estimating motion of device 400.

Image generator 446 may be configured to generate images and image streams. In some examples, image generator 446 may be configured to use only first image data from camera 430. In other examples, image generator 446 may use image data from camera 410 and/or camera 430.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value.

According to a further example, the term "substantially" used herein should be interpreted to imply possible variation of up to 1% over or under any specified value.

All patents and/or patent applications mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A device, comprising:
    a Tele folded camera comprising an optical path folding element (OPFE) for folding light from a first optical path that forms an angle of less than 90 degrees to a normal of the device toward a second optical path orthogonal to the normal of the device, a lens with a lens optical axis along the second optical path, and an image sensor, wherein the device is a handheld electronic device;
    an OPFE actuator for tilting the OPFE in one or more directions to direct a point of view (POV) of the Tele folded camera towards a segment of a scene such that coordinate systems of the Tele folded camera and the device are not aligned;
    a motion sensor for sensing an undesired rotational motion of the device;
    a processing unit configured to perform a coordinate transformation to align the coordinate system of the Tele folded camera with the coordinate system of the device or vice versa and to calculate compensation motion to compensate for the undesired rotational motion of the device in the aligned coordinate system of the Tele folded camera, wherein the compensation motion depends on the undesired rotational motion of the device and on the Tele folded camera POV; and
    at least one actuator for moving at least one component of the Tele folded camera according to the compensation motion to compensate for the undesired rotational motion of the device.

2. The device of claim 1, wherein the undesired rotation motion is around the device normal.

3. The device of claim 1, further comprising a Wide camera having a field of view $FOV_W$ larger than a field of view $FOV_T$ of the Tele camera.

4. The device of claim 1, wherein the sensing of the undesired rotational motion includes sensing of the undesired rotational motion in three directions.

5. The device of claim 1, wherein the compensating of the undesired rotational motion includes compensating the undesired rotational motion in three directions.

6. The device of claim 1, wherein the at least one actuator for moving the at least one component of the Tele folded camera to compensate for the device undesired rotational motion includes an OPFE actuator that moves the OPFE.

7. The device of claim 1, wherein the at least one actuator for moving the at least one component of the Tele folded camera to compensate for the device undesired rotational motion includes a lens actuator that moves the lens.

8. The device of claim 1, wherein the at least one actuator for moving the at least one component of the Tele folded camera to compensate for the device undesired rotational motion includes a sensor actuator that moves the sensor.

9. A device, comprising:
    a Tele folded camera comprising an optical path folding element (OPFE) for folding light from a first optical path that forms an angle of less than 90 degrees to a normal of the device toward a second optical path orthogonal to the normal of the device, a lens with a lens optical axis along the second optical path, and an image sensor, wherein the device is a handheld electronic device;
    an OPFE actuator for tilting the OPFE in one or more directions to direct a point of view (POV) of the Tele folded camera towards a segment of a scene such that coordinate systems of the Tele folded camera and the device are not aligned;
    a motion sensor for sensing an undesired rotational motion of the device;
    a processing unit configured to perform a coordinate transformation that aligns coordinates of a reference coordinate system with a coordinate system of the device and a coordinate system of the Tele folded camera and to calculate compensation motion to compensate for the undesired rotational motion of the device in the aligned coordinate system of the Tele folded camera, wherein the compensation motion depends on the undesired rotational motion of the device and on the Tele folded camera POV; and at least one actuator for moving at least one component of the Tele folded camera according to the compensation motion to compensate for the undesired rotational motion of the device.

10. The device of claim 1, wherein the coordinate transformation is performed using Rodrigues' rotation formula.

11. The device of claim 1, wherein the motion sensor includes an inertial measurement unit (IMU).

12. The device of claim 1, further comprising a microcontroller unit (MCU) configured to read out the motion sensor and to provide a control signal to the at least one actuator for moving the at least one component of the Tele folded camera to compensate for the undesired rotational motion.

13. The device of claim 12, wherein the MCU is included in an application processor.

14. The device of claim 1, further comprising an application processor configured to provide POV control signals to the OPFE actuator for tilting the OPFE.

15. The device of claim 1, wherein the Tele folded camera is a double-folded Tele camera comprising two OPFEs.

16. The device of claim 3, wherein Wide image data is used to track an object in $FOV_W$ and wherein the tracking information is used to direct the POV of the Tele folded camera towards the tracked object for object tracking with the Tele folded camera.

17. The device of claim 16, wherein the moving of a component of the Tele folded camera to compensate for the undesired rotational motion of the device is disabled during the object tracking with the Tele folded camera.

18. The device of claim 16, wherein the Wide camera additionally includes a component which is moved to compensate for the undesired rotational motion of the device, and wherein the moving of the Wide camera component is disabled during the object tracking with the Tele folded camera.

19. The device of claim 16, wherein the moving a component of the Tele folded camera to compensate for the undesired rotational motion of the device is performed at a frequency range different from a frequency range that is used for the object tracking with the Tele folded camera.

20. The device of claim 16, wherein a frequency range <30 Hz is used for the object tracking with the Tele folded camera, and wherein a frequency range >30 Hz is used to compensate for the undesired rotational motion of the device.

21. The device of claim 16, wherein a frequency range <100 Hz is used for the object tracking with the Tele folded camera, and wherein a frequency range >200 Hz is used to compensate for the undesired rotational motion of the device.

* * * * *